Patented Jan. 15, 1929.

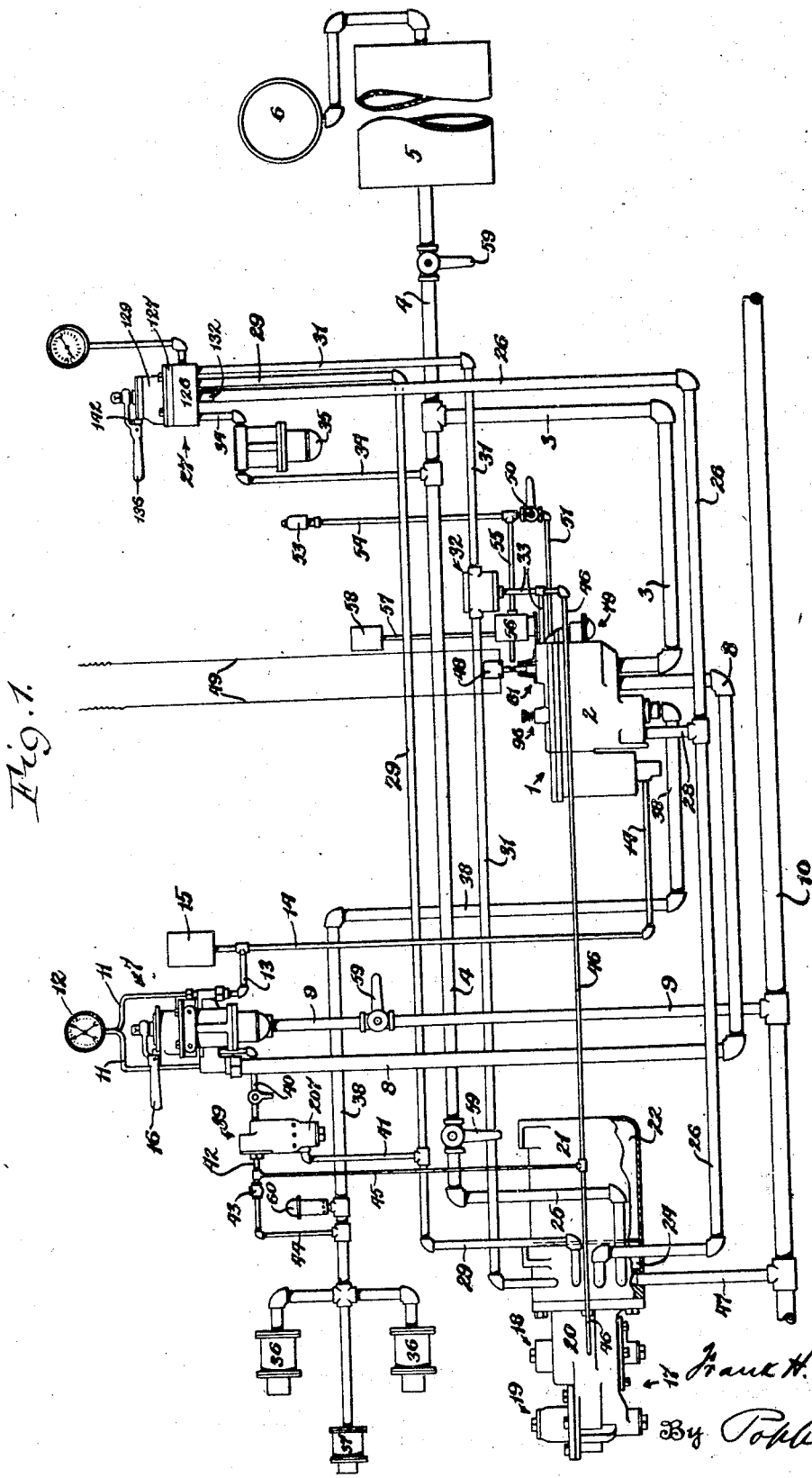

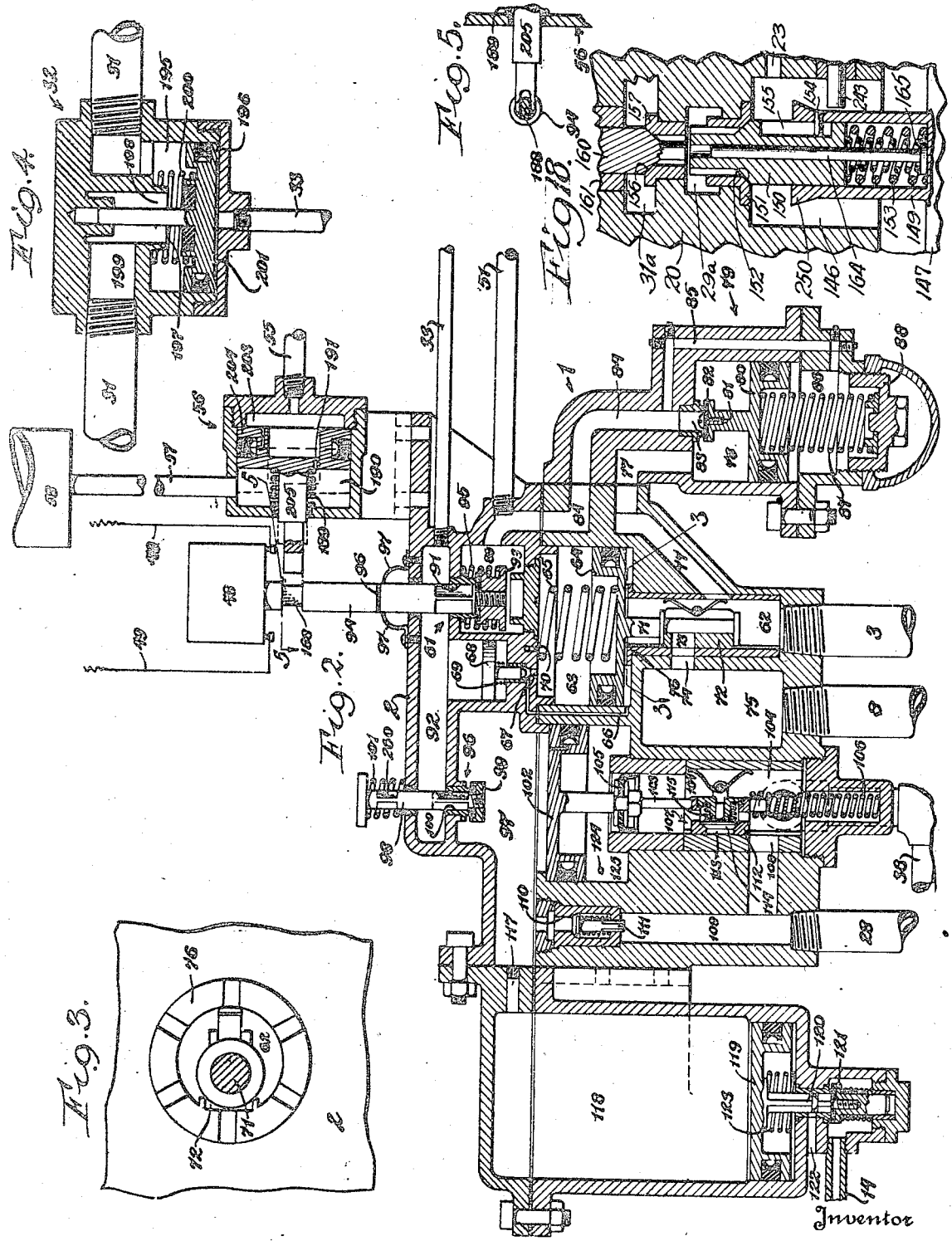

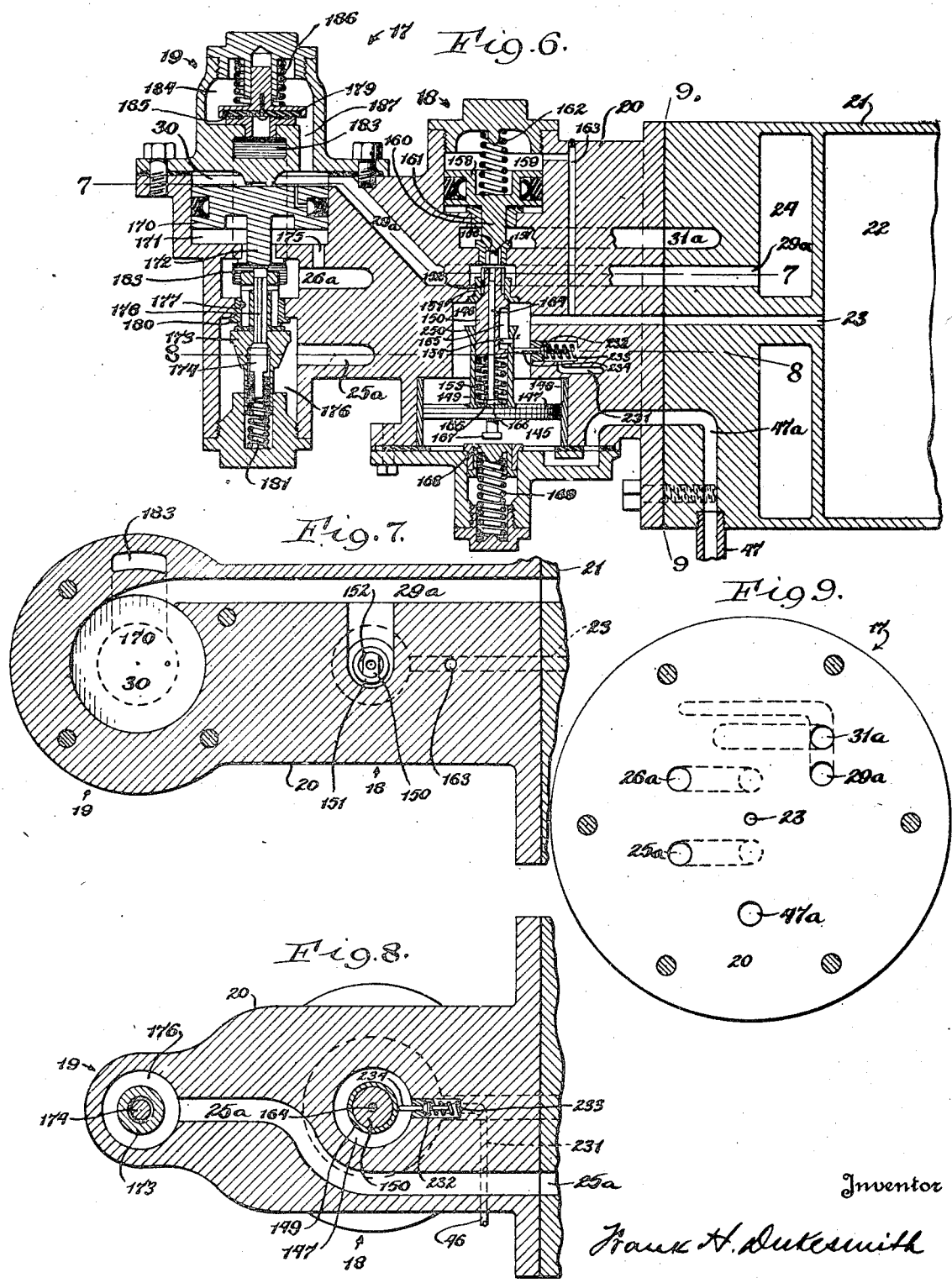

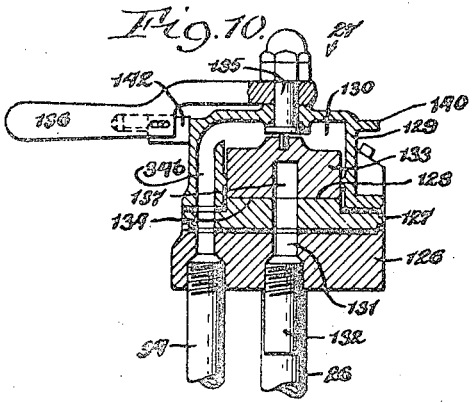
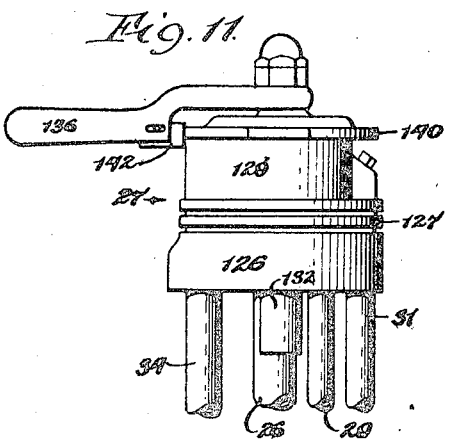
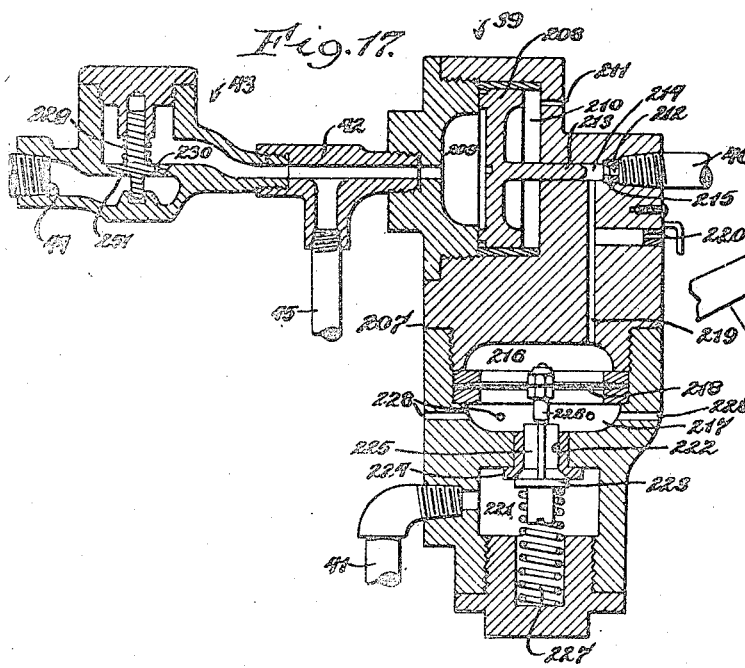
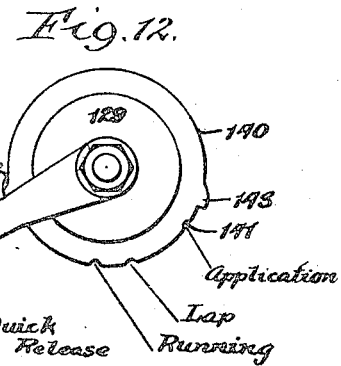
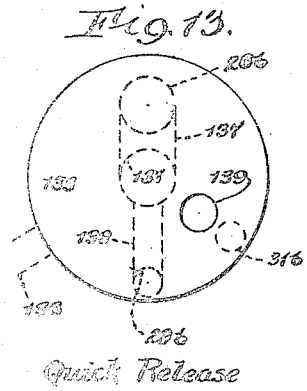
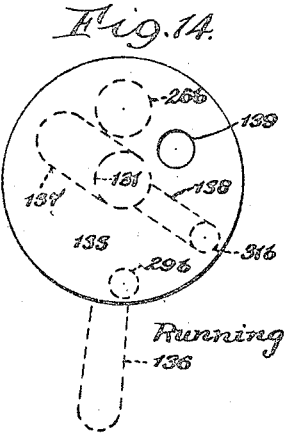
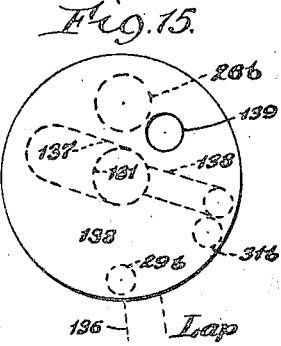
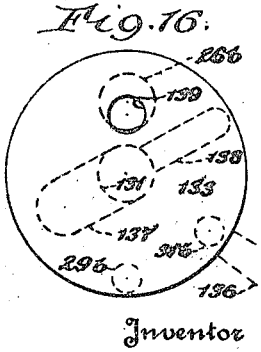

1,698,719

UNITED STATES PATENT OFFICE.

FRANK H. DUKESMITH, OF MEADVILLE, PENNSYLVANIA, ASSIGNOR, BY MESNE ASSIGNMENTS, TO FREDERICK C. BORST AND FLOYD R. STEWART, BOTH OF MEADVILLE, PENNSYLVANIA.

COMBINED ALTERNATE-CONTROL LOCOMOTIVE AIR BRAKE AND ELECTROPNEUMATIC TRAIN-CONTROL SYSTEM.

Application filed April 30, 1927. Serial No. 187,986.

This invention relates to a combined alternate control locomotive air brake and electropneumatic train control system.

The object of this invention is to provide a system of this character whereby the air brakes are automatically applied when a train attempts to pass a wayside target which is set against its forward movement if the engineman should disregard the warning signal or should he become incapacitated, and the release of the air brakes is prevented until the train is brought to a stop.

One of the principal purposes of this invention is to provide an alternate control locomotive air brake and electropneumatic train control system which will perform all the functions essential to such a system in a more simple and a more positive manner than they are now performed in systems now in common use.

Another object is to provide such a system which is comparatively inexpensive to manufacture, install and maintain.

A further object is to provide such a system which is more reliable and positive in its operation and which operates with greater safety and economy than systems now used.

A further object of this invention is to provide such a system which can be installed without complex changes in the construction or operation of the engineer's automatic brake valve and in which any standard form of engineer's automatic brake valve may be employed, the electropneumatic application of the brakes being effected by a separate valve mechanism hereinafter described.

The present invention embodies the locomotive air brake system shown in my copending application, Serial No. 188,333, filed May 2, 1927, patented December 11, 1928, No. 1,695,245.

In the accompanying drawings:

Figure 1 shows a pipe arrangement showing how the elements of my improved combined alternate control locomotive brake and electropneumatic train control system are connected. Figure 2 shows a longitudinal sectional view of the electropneumatic train control valve. Figure 3 is a horizontal fragmentary sectional view taken on line 3—3, Fig. 2. Figure 4 is a cross section of the automatic shut-off valve shown in Fig. 1. Figure 5 is a fragmentary sectional view taken on line 5—5, Fig. 2, showing the stem of the locking piston of the forestalling locking mechanism. Figure 6 is a longitudinal sectional view of the automatic distributing valve. Figures 7 and 8 are horizontal longitudinal sections thereof taken on the correspondingly numbered lines in Fig. 6. Figure 9 is a vertical cross section thereof, the same being taken on line 9—9, Fig. 6. Figure 10 is a cross sectional view of the independent brake valve. Figure 11 is a side elevation of the same. Figure 12 is a top plan view of the same. Figures 13–16 are top plan views of the rotary valve on its seat in the independent brake valve, Figure 13 showing it in its quick-release position, Figure 14 in its running position, Figure 15 in its lap position, and Figure 16 in its application position. Figure 17 is a vertical cross sectional view of my tire protecting valve. Figure 18 is an enlarged fragmentary sectional view of the internal construction of the equalizing valve mechanism shown in Fig. 6.

Similar characters of reference indicate similar parts in each of the several figures.

The apparatus illustrated in Fig. 1 of the drawings comprises my electropneumatic train control valve 1 which is housed within a casing 2. This valve is connected by a branch pipe 3 with the main reservoir pipe 4, which is connected to the main reservoir 5, the pressure in the main reservoir being supplied and maintained by a pump 6.

The numeral 7 represents any standard type of engineer's automatic brake valve, such as have been in use for many years, and this valve is supplied with main reservoir pressure through a pipe 8 which is connected at its opposite end to the electropneumatic train control valve 1. This brake valve is connected by a branch pipe 9 with the brake pipe 10 and is provided with the usual gage pipes 11 which are connected with a gage 12. This brake valve is also connected by a pipe 13 with a pipe 14, this pipe 14 being connected at one end with an equalizing reservoir 15, and at its other end with the electropneumatic train control valve 1. This brake valve is manually operated by a handle 16, which upon being moved to service application position causes the pressure in the equalizing reservoir 15 to be exhausted and thereby cause the brake pipe pressure in the brake pipe 10 to be correspondingly reduced, thus causing the brakes on the locomotive and the train to be applied in unison, according to the usual air brake practice.

The numeral 17 represents my automatic distributing valve, which includes two valve portions, the construction of which is shown in Fig. 6, one indicated at 18, functioning as an equalizing valve mechanism, and the other portion, indicated at 19, being the application and brake cylinder pressure maintaining portion. The distributing valve mechanism is arranged within a housing 20 which is bolted to a divided reservoir 21. This divided reservoir has a pressure chamber 22 which communicates through a passage 23 with the equalizing portion 18 and a control chamber 24 which communicates through a passage 29$^a$ with the application and maintaining portion 19 of the distributing valve. The valve portions 18 and 19 are connected to the other elements of the brake system by passages formed in the valve housing 20, which extend to the face thereof, shown in Fig. 9, which face is bolted against the double-chamber reservoir 21. Corresponding passages are formed in the pipe manifold of the double-chamber reservoir, and all piping connections of the distributing valve but one are made with these last named passages. By this means the piping connections are made on the double-chamber reservoir, and in the event that repairs or adjustments to the automatic distributing valve are required, the casing 20 can be removed as a unit from the double-chamber reservoir without disturbing any pipe connections and creating the danger of having the pipes connected in a wrong order upon re-assembling the system.

Main reservoir pressure is supplied to the application and maintaining portion 19 of the distributing valve through a pipe 25 which connects at one end with the main reservoir pipe 4, and at its other end connects with a passage 25$^a$ in the distributing valve casing. In a similar manner a brake cylinder pipe 26 is connected with a brake cylinder passage 26$^a$ in the distributing valve casing and at its other end with the independent brake valve 27, and also connects by a branch pipe 28 with the electro-pneumatic train control valve 1. An application chamber pipe 29 is connected by a passage 29$^a$ with the application chamber 30 of the application and maintaining portion 19 of the distributing valve, and at its other end this pipe 29 is connected with the independent brake valve 27. Similarly an automatic exhaust pipe 31 connects with a passage 31$^a$ leading to the equalizing portion 18 of the automatic distributing valve. At its other end this automatic exhaust pipe 31 connects with the independent brake valve 27 and an exhaust shut-off valve 32 is interposed in this pipe, this exhaust shut-off valve being actuated by pressure conducted through a pipe 33, this pipe being connected with the electro-pneumatic train control valve 1. The equalizing portion of the automatic distributing valve is also connected to the brake pipe 10 by a branch pipe 47 which is connected to a passage 47$^a$ leading to the equalizing portion.

Reduced main reservoir pressure is supplied to the independent brake valve 27 through a branch pipe 34 and a reducing valve 35, the other end of this pipe being connected with the main reservoir pipe 4.

The numeral 36 represents a pair of driver or locomotive brake cylinders and 37 the tender brake cylinder, air pressure to these cylinders for applying the locomotive and tender brakes being supplied through a brake cylinder pipe 38 which is connected at its other end with the electro-pneumatic train control valve 1.

To prevent an undesired application of the locomotive brakes, a tire protecting valve 39 is provided, which is connected by a pipe 40 with the engineer's automatic brake valve 7, by a pipe 41 with the application chamber pipe 29, and by a pipe 42 with a check valve 43, this check valve being connected with the brake cylinder pipe 38 by a pipe 44. A pipe 45 likewise connects the pipe 42 with a pipe 46, one end of which pipe 46 connects with the automatic distributing valve and the other end with the pipe 33 leading to the electro-pneumatic train control valve 1.

The operation of the electro-pneumatic train control valve is effected by a starting valve 61 which is actuated by de-energizing an electro-magnet 48, this electro-magnet being energized by any suitable source of electric power on the locomotive, and being de-energized when the train passes a target which is electrically set against it, any suitable form of electrified target mechanism being available for this purpose. The wires connecting this electro-magnet 48 with the electrical source of supply on the locomotive and the electrical receiver on the locomotive are indicated at 49.

To forestall the operation of the electro-pneumatic train control valve when the engineman desires to pass a target set against him, a forestalling valve 50 is provided, which is connected to the electro-pneumatic train control valve 1 by a pipe 51 and is connected to a whistle 53, by a pipe 54, and by a pipe 55 with a forestalling locking mechanism 56, this forestalling locking mechanism being connected by a pipe 57 to an equalizing reservoir 58.

Cut-out valves 59 are provided at suitable places in the system and a safety valve 60 is preferably provided in the brake cylinder pipe 38.

Construction of electro-pneumatic train control valve.

The main reservoir branch pipe 3 connects with a main reservoir pressure chamber 62. Above this chamber is arranged an equalizing chamber 63 in which is arranged a shut-off piston 64. This piston is held in its depressed or normal position by a spring 65. From the main reservoir pressure chamber 62, pressure flows under the underside of the piston 64, the bushing 76 which limits the downward movement of this piston being preferably castellated for this purpose, as shown in Fig. 3, and through a passage 66 and valve port 67 into the upper end of the equalizing chamber 63. The flow of pressure through this port is controlled by a piston valve 68 which is normally held open by a spring 69 bearing against its underside. The equalizing chamber 63 is provided with a restricted vent 70 which vents to the atmosphere.

The shut-off piston 64 is provided with a piston stem 71 which projects downwardly into the main reservoir pressure chamber 62, and carries a slide valve 72 at its lower end. This slide valve is provided with a port 73 which in the lower position of the slide valve registers with a port 74 and permits main reservoir pressure to flow into a chamber 75 and thence through pipe 8 to the engineer's automatic brake valve 7. In the normal position of the parts, pressure flows through the passage 66 into the equalizing chamber 63, and since the pressure on the opposite sides of the shut-off piston 64 are equal, the spring 65 holds the piston 64 in its depressed position in which the slide valve 72 permits main reservoir pressure to flow through the ports 73 and 74, chamber 75, and pipe 8 to the engineer's automatic brake valve 7.

From the main reservoir chamber 62, pressure flows through a passage 77 into the upper chamber 78 of the reducing valve 79. In the chamber 78 of this reducing valve is arranged a piston 80 having a stem 81, which stem forms a valve 82 at its upper end which, in the elevated position of the piston, closes a port 83 which leads into a passage 84. A by-pass 85 is provided which communicates at its upper end with the passage 84 and at its lower end communicates with the chamber 86 on the under side of the piston 80. A spring 87 is interposed between the underside of this piston and a regulating plug 88 provided at the bottom of the reducing valve, the force exerted by this spring being regulated by screwing said plug in or out to produce the desired spring tension. Main reservoir pressure entering the chamber 78 through the passage 77 would, therefore, force the piston 80 down and permit main reservoir pressure to pass through port 83 into passage 85 and chamber 86 until the pressure in chamber 86 plus the force exerted by the spring 87 equalizes with the main reservoir pressure in chamber 78 and forces the piston 80 upwardly, thereby cutting off the further flow of pressure through port 83 and into passage 84. It will thus be apparent that any desired reduced main reservoir pressure may be provided in the passage 84, this pressure being regulated by screwing or unscrewing the plug 88 to effect a greater or less tension in the spring 87.

The passage 84 communicates with a starting valve chamber 89. In this chamber is arranged the starting valve 61, which in its normal position closes a port 91 leading to a control chamber 92. This starting valve includes a valve head 93 which is secured to a stem 94, which stem extends upwardly through the casing of the automatic train control valve 1, and is adapted to be held in its elevated position by the electro-magnet 48 when said magnet is energized. The lower end of the valve stem 94 is fluted to permit air to flow from chamber 89 to control chamber 92 when said valve is lowered, and a spring 95 is interposed between the starting valve head 93 and the upper wall of the chamber 89, whereby upon deenergizing the magnet, the starting valve is moved downwardly to its open position. To hold the starting valve in its open position when the magnet has been deenergized and until the engineman manually releases it, a groove 96 is provided in the valve stem which, in the open position of the valve, is engaged by two spring fingers 97 which locks the valve open until the engineman unlocks them and allows the electro-magnet to lift the valve stem and hold it in its normal position.

When the starting valve 61 is opened, reduced main reservoir pressure passes into chamber 92 and acting on piston 68 forces the same down against the resistance of its spring 69, thereby closing port 67 and cutting off the flow of main reservoir pressure from chamber 62 to the upper side of piston 64. The air trapped in the chamber 63 above the piston 68 will thereupon immediately exhaust to the atmosphere through the restricted vent 70 and the main reservoir pressure acting against the underside of this piston will force the same upwardly against the resistance of the spring 65. This action causes the slide valve 72 carried by the stem of this piston to close the port 74 and cut off the flow of main reservoir pressure through the chamber 75 and pipe 8 to the engineer's automatic brake valve 7.

At the same time the reduced main reservoir pressure in the control chamber 92 opens and flows past the reset valve 96 into a second control chamber 97. This reset valve comprises a stem 98 extending through the automatic control valve casing and having a head 99 outside of the casing and a valve head 96 within the second control chamber 97 which is adapted to close the port 100 between these chambers 92 and 97. A spring 101 tends to keep this valve in its raised or closed position. The pressure flowing into the second control chamber 97 acts on the large head 102 of a differential piston. This differential piston has a stem 103 which extends downwardly into a brake cylinder chamber 104 and carries a small head 105 arranged in the brake cylinder pressure chamber 104. By the provision of such a differential piston a relatively low pressure in the second control chamber 97 will cause the piston to remain down even though a much greater pressure is present in the brake cylinder chamber 104. Any pressure leaking past piston heads 102 and 105 into chamber 125 between these piston heads is vented to the atmosphere through a vent passage 124. This brake cylinder chamber 104 is connected by the brake cylinder pipe 38 with the brake cylinders 36 and 37. Beneath the differential piston stem 103 is arranged a sliding check valve 107 which in the lower position of the piston is arranged over a port 108 which is arranged between the brake cylinder pressure chamber 104 and a passage 109. The upper end of this passage 109 communicates through a port 110 with the second control chamber 97, the flow through this port being controlled by a check valve 111 which permits the flow of pressure from the control chamber 97 to the passage 109, but prevents a reverse flow. The sliding check valve 107 includes a slide 112 having a port 113 extending therethrough, the flow through this port being controlled by a check valve 114 mounted in the slide and held in its closed position by a spring 115. The sliding check valve 107 is held in its normal raised position against the stem 103 of the differential piston 102, 105 by a spring 106. Therefore, in the lower position of the differential piston the sliding check valve 107 permits pressure to flow from the passage 109 to the brake cylinder chamber 104 but prevents a reverse exhaust flow from the brake cylinders. The passage 109 is connected at its lower end with the pipe 28 which connects with the brake cylinder pipe 26 leading to the automatic distributing valve and to the independent brake valve 27. Air from passage 109 flows through port 113, past sliding check valve 107 into chamber 104 and pipe 38 to the brake cylinders 36 and 37 on the locomotive and tender, thereby applying these brakes to the pressure at which the reducing valve 79 is set. At the same time pressure flows through pipes 28 and 26 to the application chamber of the automatic distributing valve.

During this operation the pressure in the second control chamber 97 also flows through a restricted passage 117 into a relatively large third control chamber 118 in the lower end of which is arranged a piston 119 having a stem 120 which extends downwardly and engages an exhaust valve 121 which controls the flow of pressure from the pipe 14 out through an exhaust passage 122 opening to the atmosphere, this pipe 14 being connected with the equalizing reservoir 15 of the engineer's automatic brake valve. This piston 119 is yieldingly held in its elevated position by a spring 123. When pressure builds up in the third control chamber 118 sufficient to depress the piston 119, down against the tension of the spring 123, the stem thereof unseats the exhaust valve 121 which exhausts the pressure from the equalizing reservoir 15 of the engineer's automatic brake valve and thereby causes the pressure in the brake pipe 10 to be reduced and the automatic distributing valve 17 and the triple valves on the cars in the train to go into operation in response to the reduction made in the brake pipe pressure as a result of exhausting the equalizing reservoir 15.

From this it will be seen that the brakes on the locomotive will be applied ahead of the brakes on the train, and that the slack in long trains will be automatically and smoothly taken up to prevent unnecessary shocks and jars to rolling stock and merchandise. However, should it be found desirable to have the locomotive and train brakes apply in unison from the beginning, a stop plug is placed in passage 109 instead of the check valve 111.

*The independent brake valve.*

Referring to Figs. 10–16, the independent brake valve mechanism comprises a body composed of a bottom section forming a pipe manifold 126, an intermediate section 127 having an upper flat seat 128, and an upper or cover section 129, formed to provide a rotary valve chamber 130, these sections being secured together in any suitable manner. The lower sections 126 and 127 are formed to provide a central exhaust passage 131 which is constantly open to the atmosphere through an exhaust nipple 132, and the upper part of the rotary valve chamber 130 is constantly under reduced main reservoir pressure, this pressure being supplied from the main reservoir line 4 through the branch pipe 34, reducing valve 35, and a passage 34$^b$ provided in the valve casing. Within the rotary valve chamber 130 is arranged a rotary valve 133 which engages its underside or face 134 with the seat 128 of the intermediate section 127. This rotary valve is provided with a stem 135 which is journaled in the top of the cover section 129 and is turned by a handle 136 attached to this stem outside of the valve body as best shown in Figs. 10 and 11. On its underside, this rotary valve is provided with a large radially extending exhaust cavity 137, the inner end of which is constantly in communication with the atmosphere through the exhaust passage 131, and this valve is also provided with a small exhaust cavity 138 which extends in a diamentrically opposite direction to said large exhaust cavity, the inner end of which small cavity is open to the main exhaust 131. This valve is also formed to provide a supply port or passage 139 which extends vertically through the valve and is adapted in the extreme right hand or application position of the valve as shown in Fig. 16 to register with the port 26$^b$, in the seat 128, which permits reduced main reservoir pressure to pass through the independent brake valve and into the brake cylinder pipes 26 and 28, passage 109, port 108, brake cylinder chamber 104, pipe 38, and thence directly to the driver and tender brake cylinders 36 and 37, thereby applying these brakes. Upon moving the handle to the left, as shown in Fig. 15, the rotary valve next assumes a lap position in which its supply port 139 and exhaust cavities are wholly out of register with the ports in the seat of the valve. Further movement of the handle to the left brings the rotary valve to its running position shown in Fig. 14. In this position the smaller exhaust cavity 138 of the rotary valve is in register at one end with the port 31$^b$ and at its other end with the exhaust 131, thereby exhausting the pipe 31 and functioning through the automatic distributing valve to exhaust the pressure from the driver and tender brake cylinders when making an automatic release of the locomotive brakes in a manner hereinafter described. Further turning of the handle 136 to the left moves it to its left extreme or quick-release position. In this position, the large exhaust cavity 137 in the rotary valve registers with the large port 26$^b$ which is connected to pipe 26 and permits the compressed air in the driver and tender brake cylinders to be directly exhausted through the pipe 38, chamber 104, port 108, passage 109, pipe 28, pipe 26, port 26$^b$, exhaust cavity 137 and exhaust port 131 of the rotary valve seat. At the same time the small exhaust cavity 138 of the rotary valve registers with a port 29$^b$, which port is connected with an exhaust pipe 29, which exhausts, through the passage 29$^a$, the application chamber 30 and prevents the application piston from operating the supply valve in a manner hereinafter described. It will be noted that in the quick-release position of the independent brake valve the air is exhausted directly from the brake cylinders through a port having many times the size of the automatic exhaust outlet as used in standard air brake systems and the valve is thereby correspondingly effective in providing for a virtual instantaneous release of the brakes when occasion demands. To indicate to the engineman the four different positions of the rotary valve, a rim 140 is formed on the upper section 129 of the valve casing, as shown in Fig. 12, and notches 141 are provided in this rim and are engaged by a dog 142 provided in the handle, these notches being spaced to conform to the positions of the valve. Stop projections 143 are also provided in this rim to limit the movement of the valve in either direction.

*The equalizing portion of the automatic distributing valve.*

The equalizing portion 18 of the distributing valve 17 arranged in the housing 20 is constructed as follows:

The numeral 145 represents a brake pipe chamber, and the number 146 represents the pressure reservoir chamber which is on the opposite side of the equalizing piston 147. The lower end of the brake pipe chamber 145 is constantly in communication with the brake pipe 10 through the branch pipe 47 and the passage 47$^a$, and at its upper end this chamber is provided with a feed groove 148. The pressure reservoir chamber 146 is constantly in communication with the pressure reservoir 22 of the double chamber reservoir through the passage 23.

On the upper side of the piston 147 the same is provided with an open ended cylindrical stem 149 within which is movably arranged a supply valve 150 having a conical face at its outer end which is adapted to engage a seating member 151 which provides a port 152. This valve 150 is yieldingly held in its outermost position relative to the piston stem 149 by a spring 153 arranged within the stem, and the movement of this valve relative to the piston stem is limited by a pin 154 which engages a longitudinal groove 155 provided in this valve.

Between the automatic exhaust passage 31$^a$ and the application chamber passage 29$^a$ an intermediate exhaust port 156 is provided, within which is arranged a valve seating member 157. This port is closed by a valve which comprises an exhaust piston 158 arranged in an exhaust piston chamber 159 above the automatic exhaust passage 31$^a$, this piston having a valve stem 160 which movably extends through a bushing 161 and is adapted to engage the valve seating member 157. This exhaust piston is yieldingly held in its lower position by a spring 162, in which position its valve stem engages the valve seating member 157 and closes the exhaust port 156. To equalize the pressures in the reservoir pressure chamber 146 and the exhaust piston chamber 159, and thereby at all times ensure the proper operation of the exhaust piston, an equalizing passage 163 is provided in the valve housing, one end of this passage communicating with the exhaust piston chamber 159 and the other end communicating with the pressure reservoir passage 23, this latter passage being in constant communication with the pressure reservoir chamber 146 and pressure reservoir 22. To open this valve 160 when the equalizing piston 147 is in its fully raised position, a plunger 164 is movably arranged in a guideway provided in the valve 150, this plunger being normally held in its retracted position by a helical spring 165 which surrounds this plunger within the piston stem 149 and is interposed between the valve 150 and a head 166 provided at the lower or inner end of this plunger. On the underside of the equalizing piston 147, a buffer 167 is provided, which is adapted in the lower position of the piston to engage a cap 168 in the floor of the brake pipe chamber 145, this cap being yieldingly held in its uppermost position by a graduating spring 169 arranged thereunder.

*The application and maintaining portion of the automatic distributing valve.*

The application and maintaining portion 19 of the automatic distributing valve 17, as shown in Fig. 6, includes an application piston 170 which reciprocates in a cylinder 30, 171, and is provided with a stem 172 extending through the lower head of the cylinder, and actuating two supply valves 173 and 174 which serve to admit main reservoir pressure to the brake cylinders on the locomotive.

The brake cylinder passage 26ª extends underneath the application piston 170 and is in constant communication with the underside of this piston through a passage 175. Below the end of the passage 26ª the housing is formed to provide a lower main reservoir pressure chamber 176 which is constantly supplied with main reservoir pressure through the passage 25ª, pipe 25, and main reservoir pipe 4.

Between the chamber 176 and the brake cylinder passage 26ª a supply port 177 is provided, the flow of pressure through which is controlled by the supply valves 173 and 174, the main supply valve 173 having a channeled guide stem 178 and a head which is yieldingly held against a seating member 180 by a spring 181. Within the supply valve 173 there is a preliminary supply valve 174, the channeled stem of which extends upwardly through the stem 178 of the supply valve 173. The upper end of the spring 181 which holds the supply valve 173 to its seat bears directly against the underside of the preliminary supply valve 174 and thereby operates to seat that valve and in turn hold the main supply valve 173 to its seat.

The brake cylinder passage 26ª also is in constant communication with the underside of an upper check valve 179 having a large seating area through a passage 183 which extends around the side of the piston chamber 30, 171. This upper check valve is arranged in a check valve chamber 184 and is yieldingly held against its seat 185 by a spring 186. This upper check valve chamber 184 communicates with the application chamber 30 through a passage 187.

*The forestalling valve.*

The forestalling valve 50, Fig. 1, permits reduced main reservoir pressure which is constantly present in the passage 84 of the train control valve 1 to pass through pipe 51 into pipe 55, and also into pipe 54 and whistle 53. The pipe 55, as shown in Fig. 2 communicates with a chamber 203 in the casing 56, within which is arranged a piston 204, this piston having a restricted passage 191 extending therethrough. This piston has a stem 205 which extends outwardly from the casing 56 and is bifurcated at its outer end as best shown in Fig. 5, and is adapted to straddle a reduced portion 188 of the starting valve stem 94. This piston 204 is normally held in the position shown in Fig. 2 by a spring 189. The chamber 190 on the inner side of the piston 204 is connected by a pipe 57 with an equalizing reservoir 58. When the engineman desires to pass a target set against him, he opens the forestalling valve 50, which permits air from passage 84 to pass through pipes 51 and 55 into chamber 203, thereby moving the piston 204 against the resistance of spring 189 and causing the bifurcated end of its stem 205 to straddle the stem 94 of the starting valve, thereby preventing this stem from dropping when the electro-magnet 48 is deenergized. This piston stays in this locking position until the pressure passing through the restricted equalizing passage 191 builds up an equal pressure in the chamber 190, and equalizing reservoir 58, the reservoir being preferably so proportioned that this equalization occurs in about fifteen seconds. When this occurs, the spring 189 forces the piston 204 backwardly, thereby unlocking the starting valve stem 94. By this means should the engineer leave the forestalling valve 50 open, the locking mechanism will remain in operation for fifteen seconds only and the starting valve will operate on attempting to pass the next target in its usual manner. Upon turning off the forestalling valve, the pressure in chamber 203 will exhaust through pipes 55 and 54 and the whistle 53, and at the same time the pressure in the equalizing reservoir 58 will exhaust through pipe 57, chamber 190, restricted passage 191, and thence out through pipes 55 and 54, and the whistle 53, in the same manner.

*Exhaust stop valve.*

To prevent the exhaust of the locomotive brake cylinder pressure when the starting valve 61 has opened and admitted reduced main reservoir pressure into the first control chamber 92, an exhaust stop valve 32 is provided which, as shown in Fig. 4, comprises a casing forming a chamber 195 within which is arranged a piston valve 196, which in its elevated position seats against a seat 197 and closes a port 198. This port connects by a passage 199 with one end of the automatic exhaust pipe 31, while the other end of this pipe connects with the chamber 195, the automatic stop valve being interposed between these two pipe ends. A spring 200 normally tends to hold the piston 196 in its depressed position. The chamber 201 on the underside of the piston 196 is connected by the pipe 33 with the chamber 92 of the train control valve 1. When the starting valve 61 is lowered, the pressure from passage 84 passes into chamber 92 and thence through pipe 33 to the underside of piston 196, thereby raising this piston and cutting off the flow of pressure from passage 199 to chamber 195 and thereby preventing exhaust through the exhaust pipe 31.

*The tire protecting valve.*

The prevention of an undesired service application of the locomotive brakes is effected by means which preferably are constructed as follows:

Referring to Figs. 1 and 17, the numeral 207 represents the casing of a tire protecting valve 39 which is connected at its upper end by a pipe 40 with a channel (not shown) in the engineer's automatic brake valve 7, which channel, during the release and running position of the engineer's automatic brake valve, is charged with main reservoir pressure. At its lower end this tire protecting valve is connected by a pipe 41 with the application chamber pipe 29, which latter is in constant communication with the application chamber 30 of the automatic distributing valve. At its upper end this tire protecting valve is connected by a pipe 42 with a pipe 45 which is connected with the distributing valve casing 20 and this pipe 42 is also connected to a check valve 43, this check valve also being connected by a pipe 44 with the brake cylinder pipe 38.

A piston chamber is provided in the upper part of the tire protecting valve casing 207 and in this chamber is arranged a piston 208 which forms two chambers 209 and 210 on its opposite sides. In the chamber 210 there is a vent port 211 which leads directly to the atmosphere. For the purpose of controlling the flow of pressure through the port 212, the piston 208 is provided with a valve stem 213 movably arranged in a passage 214 at the outer end of which a valve seat 215 is provided. The port 212 communicates with the pipe 40 and passage 219. Below this piston 208 the tire protecting valve casing is formed to provide a chamber 216 and a chamber 217, these two chambers being separated by a flexible diaphragm 218. The upper diaphragm chamber 216 is connected by a passage 219 with the passage 214 and is also vented to the atmosphere through a restricted vent 220. When the piston 208 is moved toward the pipe 40, its valve stem 213 is seated against its seat 215 and thereby closes the port 212 and cuts off communication between this passage 219 and the pipe 40.

At its lower end the tire protecting valve is provided with a chamber 221 which communicates with the pipe 41. An exhaust port 222 extends between the chamber 221 and the lower diaphragm chamber 217 and in this port is arranged an exhaust valve 223 which seats in a seating member 224 and is provided with a fluted stem 225 which extends upwardly into the lower diaphragm chamber 217. The diaphragm 218 is provided on its underside with a stem 226 which engages with the stem 225 of the exhaust valve 223, and in the normal depressed position of the diaphragm holds the exhaust valve 223 in its opened position. When the pressure in chamber 216 is vented, a spring 227 causes the exhaust valve 223 to be held against its seat. The lower diaphragm chamber 217 is vented to the atmosphere by a plurality of vents 228 in the side of the casing. The chamber 209 on one side of the piston 208 opens into a passage connected with the pipe 42, which pipe is connected to the check valve 43. This check valve comprises a valve member 251 which is yieldingly held in its seated position by a spring 229 and in this check valve a restricted passage 230 is provided. The opposite side of the check valve 43 is connected to the brake cylinder pipe 38 by the pipe 44. Between the check valve 43 and the tire protecting valve a pipe 45 connects with the pipe 42 and at its opposite end to a pipe 46 which in turn connects with a passage 231 which leads to the pressure reservoir chamber 146 of the distributing valve. In this passage is arranged a check valve 232 which is held to its seat by a spring 233. On the inner side of this check valve a stem 234 is provided which extends into the pressure reservoir chamber 146. The outer end of the stem of the equalizing piston 147 is enlarged to form an outwardly flaring wedging portion 250.

When the brake pipe pressure in chamber 145 is reduced sufficiently to cause the piston 147 to move down to its full service or emergency position, the wedge shaped projection on the stem 149 of the piston 147 engages with the stem of the check valve 232 and causes this valve to be forced from its seat, thereby permitting pressure to flow, from the pressure reservoir chamber 146 through passage 231, and pipes 46, 45 and 42 to chamber 209, which causes the piston 208 to be moved over until its stem 213 closes the port 212 and shuts off the flow of main reservoir pressure from pipe 40 into chamber 216, and as the pressure is instantly vented to the atmosphere via vent port 220, this allows the spring 227 to force the exhaust valve 223 to its seat and thereby prevent the exhaust of pressure from the chamber 217. This permits the pressure in the application chamber 30 to operate the piston 170 in the usual way.

Assuming the train control valve 1 to be in its normal inoperative position, as shown in Fig. 2, the operation of the air brake system is as follows:

*Charging and release position of the distributing valve.*

Brake pipe pressure enters the lower brake pipe chamber 145 of the equalizing portion of the automatic distributing valve from the brake pipe 10 through the pipe 47 and passage 47$^a$, forces the equalizing piston 147 to its upper or charging position, and then flows through the feed groove 148 into the pressure reservoir chamber 146, and through the passage 23 into the pressure reservoir 22 of the double chamber reservoir 21. At the same time pressure flows from the passage 23 through the passage 163 into the exhaust piston chamber 159 and charges this chamber to the same pressure that is in the pressure reservoir 22 and pressure reservoir chamber 146. The upward movement of the piston 147 also moves the supply valve 150 upwardly until it engages its seat in the seating member 151 and closes the passage 152 between the pressure reservoir chamber 146 and the application chamber passage 29$^a$. When the piston 147 is moved upwardly to close the feed groove 148, the supply valve 150 is closed, and further upward movement of the piston 147 causes the plunger 164 to be moved upwardly through its guideway in the valve 150 and caused to engage the intermediate exhaust valve stem 160 and thereby unseat this valve and hold it open to establish communication between the application chamber passage 29$^a$ and the automatic exhaust passage 31$^a$.

*Charging of independent brake valve.*

The upper chamber 130 of the independent brake valve, as shown in Fig. 10, is constantly supplied with reduced main reservoir pressure through main reservoir pipe 4, branch pipe 34, in which is located a reducing valve 35, and passage 34$^b$ which opens into the chamber 130, containing the rotary valve 133.

*Running position.*

In the running position of the independent brake valve, as shown in Fig. 14, the small exhaust cavity 138 is in register with the port 31$^b$ in the valve seat.

*Automatic service application of the brakes.*

When a reduction of pressure occurs in the brake pipe 10, a similar reduction is caused in the chamber 145 of the equalizing portion of the distributing valve, and the pressure in the pressure reservoir chamber 146 forces the piston 147 down past the feed port 148, thereby placing the chamber 145 and 146 out of communication. The downward movement of piston 147 continues until the buffer 167 bears against the cap 168 of the graduating spring 169. This downward movement of the piston also causes the pin 154 in the piston stem 155 to pull the supply valve 150 from its seat and open the port 152. The movement of the piston 147 downward also permits the exhaust piston 158 to move down and cause its stem 160 to close the intermediate exhaust port 156 between the application chamber passage 29$^a$ and the automatic exhaust passage 31$^a$. Air from the pressure reservoir 22 of the double chamber reservoir 21 is then free to flow through passage 23, chamber 146, port 152, into passage 29$^a$. One end of the application chamber passage 29$^a$ communicates with the control chamber 24 of the double chamber reservoir and the other end with the application chamber 30. The control chamber 24 of the double chamber reservoir is for the sole purpose of supplying volume to the application chamber 30.

When the pressure has thus entered application chamber 30, it forces application piston 170 downward and causes its stem 172 to engage first with the fluted stem 178 of the preliminary supply valve 174 forcing it from its seat and further downward movement of the piston 170 causes its stem to engage the stem 178 of the main supply valve 173 and force it from its seat. Opening the supply valves 173 and 174 permits main reservoir pressure to flow into the brake cylinders on the locomotive to a pressure slightly greater than the pressure in the application chamber 30 through the following circuit: main reservoir pipe 4, branch pipe 25, passage 25$^a$, chamber 176, supply port 177, into passage 26$^a$, brake cylinder pipes 26, and 28, into passage 109, as shown in Fig. 2, through port 108, into brake cylinder chamber 104, brake cylinder pipe 38 and brake cylinders 36 and 37. At the same time the pressure in chamber 171 below the application piston 170 is charged to a pressure equal to the pressure in the brake cylinder passage 26$^a$ through the passage 175, and therefore when the pressures in the brake cylinder passage 26$^a$ and chamber 171 are slightly in excess of the pressure in the pressure chamber 30, the application piston 170 is forced upward, the movement allowing the supply valves 173 and 174 to seat and cut off further flow of main reservoir pressure into the brake cylinders on the locomotive.

The reduction of the brake pipe pressure which causes the distributing valve to make an automatic application of the locomotive brakes will also cause the triple valves on the cars to make an automatic application of the brakes on the train and cause the train brakes to apply in unison with the brakes on the locomotive.

When the pressure in the pressure reservoir chamber 146 becomes slightly less than the pressure in chamber 145, the equalizing piston 147 moves up until the supply valve 150 closes the supply port 152, but the piston does not travel far enough to open the intermediate exhaust port 156 or the feed groove 148. This lap position of the equalizing portion of the distributing valve is shown in Fig. 6.

*Brake cylinder maintaining action of the distributing valve.*

Should any leakage occur from the brake cylinders 36 and 37 on the locomotive or through the brake cylinder pipe connections, it would cause a reduction of pressure in brake cylinder passage 26ª and chamber 171, and thereby cause the pressure in application chamber 30 to again force the application piston 170 downward until its stem unseats the preliminary supply valve 174 and thereby permit main reservoir pressure to again flow into the brake cylinder passage 26ª and again build up the pressure in the brake cylinders on the locomotive to an amount slightly in excess of the pressure in the application chamber 30 when the piston 171 will again be raised, thereby permitting the preliminary supply valve to again close and shut off any further flow of main reservoir pressure into the brake cylinder passage 26ª.

*Automatic release of the locomotive brakes.*

The independent brake valve being in running position, as shown in Fig. 14, and the equalizing portion of the distributing valve being in lap position, as shown in Fig. 6, then when main reservoir pressure is allowed to flow through the engineer's automatic brake valve 7 to recharge the brake pipe 10, and the pressure in the brake pipe chamber 145 becomes slightly greater than the pressure in the chamber 146, it forces the equalizing piston 147 upward. This upward movement of the equalizing piston 147 causes the plunger 166 to engage and unseat the stem 160 of the piston 158 thereby opening the intermediate exhaust port 156. At the same time that this exhaust port 156 is uncovered the feed groove 148 is opened and pressure is permitted to flow from chamber 145 through the feed groove 148 and into chamber 146 and through passage 23 into the pressure reservoir 22 of the double chamber reservoir 21, thereby recharging the pressure reservoir 22 to brake pipe pressure. At the same time pressure from the pressure reservoir chamber 146 flows through the passage 163 into the exhaust piston chamber 159 thereby charging this chamber also to brake pipe pressure.

With the equalizing piston 147 in its recharging and release position and the exhaust valve 160 open, air from the application chamber 30 and the check valve chamber 184 flows through application chamber passage 29ª, intermediate exhaust port 156, automatic exhaust passage 31ª, into pipe 31, and thence through the port 31ᵇ in the independent brake valve seat, into the small exhaust cavity 138 and through the main exhaust outlet 131 directly to the atmosphere.

When the pressure is thus exhausted from the application chamber 30 and the check valve chamber 184, it permits the release of brake cylinder pressure on the locomotive in the following manner: The pressure in brake cylinders 36 and 37 flows through brake cylinder pipe 38, brake cylinder chamber 104, through port 108, passage 109, pipes 28 and 26, passage 26ª, through by-pass 183, thereby lifting the check valve 179 and opening port 185, which permits the air to flow through port 185 into check valve chamber 184, passage 187 into application chamber passage 29ª, through intermediate exhaust port 156 into automatic exhaust passage 31ª, and thence through automatic exhaust pipe 31, port 31ᵇ, small exhaust cavity 138 and into the main exhaust passage 131 into the atmosphere. The pressure in chamber 171 on the underside of the application piston 170 exhausts simultaneously with the pressure in brake cylinder passage 26ª. The charging of the brake pipe 10 causes the triple valves on the cars to release and thereby causes the train and locomotive brakes to be released in unison.

*Independent application of the locomotive brakes.*

When the handle of the independent brake valve is placed in application position, as shown in Fig. 16, the supply port 139 extending through the rotary valve is in register with the brake cylinder port 26ᵇ in the seat of the valve which permits reduced main reservoir pressure which is constantly present in chamber 130 to flow through these ports into the brake cylinder pipes 26 and 28, into passage 109, as shown in Fig. 2, through port 108, into brake cylinder chamber 104 and through pipe 38 directly into the brake cylinders 36 and 37 and apply the brakes on the locomotive to the amount which may be desired which may be of any amount up to the pressure at which the reducing valve 35 is set. At the same time that pressure is flowing into the brake cylinders, it flows from pipe 26 into brake cylinder passage 26ª, through by-pass 183, to the underside of the check valve 179, lifting this valve and flowing through check valve chamber 184, passage 187, into application chamber 30, and through application chamber passage 29ª into the control chamber 24 of the double chamber reservoir 21. When the check valve chamber 184 is charged equal to the pressure in the brake cylinders, the check valve 179 automatically closes and traps the air in the application chamber 30 above the application piston 170, thereby placing in operation the brake cylinder pressure maintaining feature, as previously described.

It will be noted that by this construction, the engineer is enabled not only to make a direct application of the locomotive brakes but this operation also puts in operation the automatic brake cylinder pressure maintaining feature of the distributing valve.

*Normal automatic release of locomotive brakes after independent application.*

When the equalizing portion of the distributing valve is in its release position, the locomotive brakes may be released either in the normal automatic manner or virtually instantaneously according to whether or not the independent brake valve is put in its running or quick-release position.

When the equalizing portion of the automatic distributing valve is in its release position and the independent brake valve is placed in its running position, the pressure in the brake cylinders is exhausted through the automatic distributing valve in the manner previously described with reference to the automatic release of the locomotive brakes.

*Independent quick release of the locomotive brakes.*

To effect an independent quick release of the locomotive brakes, the handle of the independent brake valve is placed in its quick-release position, as shown in Fig. 13, in which the large cavity 137 of the rotary valve 133 is in register with the port 26$^b$, thereby permitting brake cylinder pressure to exhaust directly to the atmosphere through brake cylinder pipe 38, brake cylinder chamber 104, port 108, passage 109, pipes 28 and 26, port 26$^b$, large cavity 137, and into the exhaust outlet 131. At the same time the small exhaust cavity 138 of the rotary valve is in register with the port 29$^b$ and the pressure in the application chamber 30 is exhausted directly to the atmosphere through passage 29$^a$, pipe 29, port 29$^b$, cavity 138 and exhaust outlet 131. In this position of the independent brake valve, therefore, both the brake cylinders and the application chamber 30 are directly exhausted to the atmosphere regardless of the position of the equalizing portion of the distributing valve.

*Graduated release of locomotive brakes.*

When the equalizing portion 18 of the automatic distributing valve is in release position, a graduated release of the locomotive brakes may be effected by moving the handle of the independent brake valve back and forth between its running position shown in Fig. 14, and its lap position shown in Fig. 15, thereby gradually exhausting the locomotive brakes through the distributing valve as described. If the equalizing portion of the automatic distributing valve is in its lap position, as shown in Fig. 6, in which the intermediate exhaust valve 160 is closed, a graduated release may be effected by moving the handle of the independent brake valve back and forth between its running position, shown in Fig. 14, and its quick-release position, shown in Fig. 13, thereby gradually exhausting the brake cylinder pressure directly from the brake cylinders to the atmosphere.

*Holding position.*

When it is desired to hold the locomotive brakes and release the train brakes, the handle of the independent brake valve is moved to its lap position, in which the supply port and cavities of the rotary valve are out of communication with all of the ports in the valve seat. Inasmuch as the brake cylinder pressure is at all times released through the independent brake valve, it follows that placing this independent brake valve in lap position completely prevents the exhaust of pressure from the locomotive brake cylinders regardless of the operation of the engineer's automatic brake valve.

*Operation of the tire protecting valve.*

The purpose of the tire protecting valve is to prevent an undesired application of the locomotive brakes. As will be noted, chamber 221 through pipe connection 41 connects with the application chamber pipe 29 and is thereby in constant communication with the application chamber 30. The exhaust valve 223 in the tire protecting valve, in the normal running and release position of the engineer's automatic brake valve, is held off its seat by the pressure which flows from the engineer's automatic brake valve into the chamber 216 above the diaphragm 218. Therefore, during the running and release position of the engineer's automatic brake valve, the application chamber 30 of the distributing valve is always vented through the application chamber passage 29$^a$, pipe 29, pipe 41, chamber 221, past the vent valve 223 into the lower diaphragm chamber 217, and thence through the vent passages 228 to the atmosphere, except as hereinafter explained.

Should the engineman overcharge the brake pipe 10, the brake pipe chamber 145, the pressure reservoir chamber 146, and the chamber 22 of the double chamber reservoir are similarly overcharged. When the engineman then moves the engineer's automatic brake valve back to running position, since the pressure in the brake pipe is higher than the pressure at which the feed valve in the engineer's automatic brake valve is set, the pressure in the brake pipe 10 and chamber 145 flows down the brake pipe in the train, thereby causing a reduction in the pressure in the brake pipe chamber 145. This reduction of pressure in the chamber 145 causes the equalizing piston 147 to be depressed to its service position by the overcharged pressure in the pressure reservoir chamber 146 and this action thereby unseats supply valve 150 and permits air to flow from the pressure reservoir chamber 146 through the port 152 and into application chamber passage 29ª. Without the provision of the tire protecting valve, this pressure would flow into the application chamber 30 and depress the application piston 170 to open the supply valve 173 and admit main reservoir pressure from the passage 25ª to the brake cylinder passage 26ª and thereby apply the locomotive brakes. Inasmuch, however, as the application chamber pipe 29 is continuously vented to the atmosphere when the engineer's automatic brake valve is in release or running position, except as hereinafter explained, this pressure instead of applying the locomotive brakes, passes through the application chamber passage 29ª, pipes 29 and 41, chamber 221, port 222, chamber 217, and vents 228, to the atmosphere, thereby preventing the operation of the application piston 170 in the distributing valve. But should the brake pipe pressure be reduced by reason of the conductor on the train opening a conductor's valve or an angle cock, or should the brake pipe in the train become parted, the equalizing piston 147 would then move down to its full service or emergency position which would cause the wedge shaped projection 235 on the stem 149 to force the valve 232 from its seat and thereby permit the pressure from the pressure reservoir 22 of the double chamber reservoir to flow through passage 231 and into pipes 46, 45 and 42, and thence into chamber 209 against the piston valve 208, causing it to move over until its valve stem 213 closes the port 212 and shuts off the flow of main reservoir pressure from the engineer's automatic brake valve through pipe 40, into the chamber 216 above the diaphragm 218. The pressure in chamber 216 will then be instantly vented to the atmosphere through the vent port 220, thereby permitting the spring 227 to drive the vent valve 223 to its seat and prevent the pressure from escaping from the application chamber 30 of the distributing valve, which permits the application piston 170 to operate in its usual manner in applying the locomotive brakes.

Inasmuch as pressure flows from the engineer's automatic brake valve through the pipe 40 and into the tire protecting valve only when the engineer's automatic brake valve is in release or running position, it follows that when an automatic application of the brakes is made by the engineer's automatic brake valve the flow of pressure into the chamber 216 of the tire protecting valve is cut off, the exhaust valve 223 thereby closes, and the venting of the application chamber 30 is thereby prevented. The automatic distributing valve thereupon functions in its normal manner to make an automatic application of the locomotive brakes as described under the caption "Automatic service application of the brakes."

The small vent passage 230 in the check valve 228 is for the purpose of allowing the pressure in the chamber 209 to flow back into the brake cylinders after the brakes have been released. This permits the piston 208 to move back to its normal position and permit main reservoir pressure to flow from the automatic brake valve into the chamber 216 and thereby reopen the exhaust valve 223.

When a direct independent application of the locomotive brakes is made, pressure flows through the independent brake valve by way of the ports and passages in the train control valve 1 to the brake cylinders. At the same time pressure flows from the brake cylinder pipe 38 through pipe 44, lifting check valve 228 and passing through pipe 42 into chamber 209 of the tire protecting valve. This pressure then acting on piston 208 causes its stem 213 to seat and close port 212, thereby cutting off the flow of pressure from the engineer's automatic brake valve into the chamber 216, the air in this chamber exhausts through the small vent 220 and the diaphragm 218 is raised by the spring 227 and seats the vent valve 223. By this means the application chamber 30 of the distributing valve is cut off from communication with the atmosphere when an independent application of the brakes is made and the brake cylinder pressure maintaining feature of the distributing valve functions in the usual manner previously described.

*Operation of the train control valve.*

Assuming the train control valve 1 to be in its normal position, as shown in Fig. 2, the operation of the same is as follows:

Reduced main reservoir pressure is constantly present in the passage 84 and chamber 89 of the train control valve 1, this pressure being supplied from the main reservoir pipe 4, through the branch pipe 3, main reservoir pressure chamber 62, passage 77, reducing valve 79, and passage 84. When, therefore, the electro-magnet 48 is deenergized, the starting valve stem 94 is forced down by spring 95 and the starting valve 61 is thereby opened and permits reduced main reservoir pressure to flow from passage 84 and chamber 89 into the first control chamber 92.

The pressure in chamber 92 first acts to depress the piston valve 68, thereby closing port 67 and preventing the flow of main reservoir pressure from the main reservoir pressure chamber 62, under the piston 64, through passage 66, and port 67, into the chamber 63 on the upper side of this piston. The pressure in this chamber 63 thereupon vents through the vent passage 70, and the main reservoir pressure under the piston 62 raises it and thereby causes the slide valve 72 carried by its stem 71 to close port 74 and cut off the flow of main reservoir pressure through chamber 75, and pipe 8, to the engineer's automatic brake valve 7. This cutting off of pressure to the engineer's automatic brake valve prevents the engineer from charging the brake pipe 10 and releasing the brakes on the train, but it does not prevent the movement of the brake valve handle to either service or energizing position.

As the exhaust of the brake cylinder pressure on the locomotive is always by way of pipe 31, and the independent brake valve 27, this exhaust outlet is simultaneously closed by reason of the operation of the exhaust shut-off valve shown in Fig. 4, its operation being as follows:

The pressure in chamber 92 flows through pipe 33 to the underside of piston valve 196; drives it upward causing it to close port 198 and prevent the exhaust of brake cylinder pressure through the pipe 31 and the independent brake valve 27.

Pressure in chamber 92 unseats the reset valve 96 which permits the pressure to flow from chamber 92 to chamber 97 and against the differential piston 102. This pressure forces this piston down and causes its stem 103 to drive the sliding check valve 107 down until this sliding check valve covers port 112. At the same time pressure in chamber 97 flows through port 110, past check valve 111 into passage 109, and through port 112, through ports 108 and 113 in the sliding check valve 107, into brake cylinder chamber 104, brake cylinder pipe 38, and into brake cylinders 36 and 37, thereby applying the brakes on the locomotive to the pressure at which the reducing valve 79 is set. At the same time pressure flows through pipes 44 and 42 into chamber 209 of the tire protecting valve, causing that valve to operate in the usual manner to allow the exhaust check valve 223 to close the exhaust outlet from the application chamber 30 of the distributing valve. At the same time pressure from passage 109 flows into pipe 28 and 26, thereby charging the application chamber 30 of the distributing valve. At the same time pressure from chamber 97 flows through passage 117 into the third control chamber 118 against the piston 119, thereby driving it down until its stem 120 opens the exhaust valve 121 and allows pressure from the equalizing reservoir 15 of the engineer's automatic brake valve to exhaust by way of pipe 14, past the exhaust valve 121, and through the exhaust outlet 122. This exhaust of pressure from the equalizing reservoir 15 permits the pressure in the brake pipe 10 to lift the equalizing discharge valve in the engineer's automatic brake valve and exhaust the pressure from the brake pipe 10 in the usual manner, thereby causing the brakes on the train to be applied in the usual manner. This reduction of brake pipe pressure also causes the automatic distributing valve to go into operation and supply pressure to the brake cylinders on the locomotive in the following manner:

The reduction of brake pipe pressure causes the equalizing piston 147 to move down and permit the flow of pressure from the pressure chamber 22 of the double chamber reservoir to the application chamber 30. This causes the application piston 170 to move down and open the supply valves 173 and 174 which allow main reservoir pressure to flow from the main reservoir passage 25$^a$ into the brake cylinder passage 26$^a$ and through pipe 26 and 28 through port 108 and port 113 in the sliding check valve 107, through brake cylinder chamber 104 into pipe 38 and to the brake cylinders 36 and 37. In pipe 38 there is interposed a safety valve 60 which prevents the pressure in the brake cylinders from getting higher than the pressure at which the safety valve is set.

When the starting valve 61 of the train control valve opens and admits pressure into control chamber 92, pressure from that chamber flows through pipes 33, 46, 45 and 42 into chamber 209, thereby moving the piston 208 to its closing position and shutting off the flow of pressure from the automatic brake valve through pipe 40, which action permits the exhaust valve 223 to close and shut off the exhaust of pressure from the control chamber 30 of the distributing valve.

It will be seen from this operation that the locomotive brakes will be first applied to a predetermined pressure and the cars permitted to run in and take up the slack in the train before the train brakes are applied. But should it be desired that the locomotive and train brakes apply in unison, a stop plug may be substituted for the check valve 111 in passage 109 and the substitution of this plug for the check valve 111 will cause the engine and train brakes to apply in unison when the starting valve 61 opens in response to the deenergizing of the electro-magnet 48.

*Forestalling the action of the train control valve.*

If the engineman desires to pass a target set against the forward movement of the train, immediately before passing the target, he turns on the forestalling valve 50 which permits reduced main reservoir pressure to flow from pasage 84 in the train control valve through pipes 51 and 55 into chamber 203. This drives the piston 204 against the resistance of its spring 189 and causes the bifurcated end of its stem 205 to straddle the reduced portion 188 of the stem 94 of the starting valve and prevent the spring 95 from unseating the starting valve 61 when the electromagnet 48 is deenergized on passing the target. At the same time the pressure from chamber 203 passes through the equalizing passage 191 in the piston 204 and into the equalizing reservoir 58 through the pipe 57. When the pressures on the opposite sides of the piston 204 and in the equalizing reservoir 58 are equalized, this being calculated to occur in about fifteen seconds, the spring 189 moves the piston 204 in the reverse direction, thereby disengaging the bifurcated stem of the piston 204 from the starting valve stem 94, thus leaving the train control valve ready for the automatic operation. It is therefore necessary for the engineman to operate the forestalling valve 50 each time he desires to pass a target that is set against him. Inasmuch as the pipe 55 is in constant communication with the pipe 54 and whistle 53, when the forestalling valve 50 is closed, pressure in the equalizing reservoir 58, pipe 57, and chamber 190 and 203 will freely vent through pipes 55 and 54 and the whistle 53.

*Resetting train control valve and releasing brakes after electro-pneumatic application.*

After an electro-pneumatic application has brought the train to a complete stop, the engineman is required to step out of the engine cab and reset the train control valve.

He first releases the spring fingers 97 from engagement with the groove 96 in the starting valve stem 94, which permits the energized electro-magnet to draw up the starting valve stem 95 and close the starting valve. He next presses down the head 99 of the reset valve 96, which permits pressure in the first control chamber 92 to exhaust to the atmosphere past the upper fluted portion 260 of the reset valve stem 98. At the same time pressure from control chambers 118 and 97 is vented to the atmosphere through the fluted portions 100 and 250 of the reset valve.

The exhausting of the chamber 92 exhausts the chamber 201 in the automatic exhaust stop valve 32 through the pipe 33, and thereby permits the spring 200 in this valve to lower the piston 196 and permit the free exhaust of pressure through the automatic exhaust pipe 31 and the independent brake valve. At the same time the spring 69 raises the piston valve 68 and permits the main reservoir pressure from the main reservoir pressure chamber 62 to flow through passage 66, port 67, into chamber 63, thereby permitting the pressures above and below the piston 64 to equalize and causing the spring 65 to force the piston 64 down and cause the slide valve 72 carried by its stem 71 to open the port 74 and chamber 75 into the pipe 8 leading to the engineer's automatic brake valve, thereby enabling the engineman to recharge the brake pipe and cause the distributing valve on the locomotive and the triple valves on the cars to assume their charging and release positions.

The exhausting of pressure from the second control chamber 97 permits the differential piston 102, 105 to be raised by the brake cylinder pressure and the spring 106, which movement raises sliding check valve 107 carried by its stem to uncover the port 108, and permits the free exhaust of air from the brake cylinder pipe 38 through the brake cylinder chamber 104, port 108, passage 109, pipes 28 and 26, and through the distributing valve into pipe 31 and out through the independent brake valve in the usual manner.

Pressure also exhausts from the third control chamber 118 through the passage 117, and this exhaust permits the piston 119 to raise and allow the exhaust valve 121 to close and cuts off exhaust from the equalizing reservoir 15 through the pipe 14 and exhaust 122.

It will thus be apparent that by opening the resetting valve 96, the control chambers in the train control valve are exhausted and the parts therein automatically returned to their normal position indicated in Fig. 2, in which the train and locomotive brakes can be applied or released independently or in unison, and either quickly or gradually, as previously described with reference to the operation of the brake system when the train control valve is in normal position.

It will also be noted that the present invention provides a train control system in which, while the train control valve is in operation, the air pressure to the locomotive brake cylinders is at no time cut off. Thus while the train control valve is in operation, air pressure can at all times, as shown in Fig. 2, pass from the reservoir pipe 3, through passage 77, reducing valve 79, passage 84, chamber 89, port 91, control chamber 92, port 100, second control chamber 97, port 110, passage 109, port 108, port 113, chamber 104 and through pipe 38 directly to the locomotive brake cylinders. By this means when the train control valve is placed in operation, the pressure in the locomotive brake cylinders is maintained at the pressure at which the reducing valve 37 is set, and if, therefore, any pressure should leak from these cylinders, no reduction in pressure occurs. Without this pressure maintaining feature, a leakage in locomotive brake cylinder pressure would effect a release of the locomotive brakes which might result in a lurching ahead of the locomotive with consequent damage.

As a whole, this invention is comparatively simple in construction and operation, considering the functions it performs. It is relatively inexpensive to manufacture, install and maintain; it is positive and reliable in operation; it can be operated in connection with any standard train brake system and engineer's automatic brake valve now in common use, and, when an electro-pneumatic application of the brakes is made, the train is bunched and brought to a stop without shock and jar and consequent damage to the rolling stock or to the merchandise in transit.

I claim as my invention:

1. In combination with an air brake system having means for supplying compressed air, a main reservoir for storing compressed air, a brake pipe, an engineer's automatic brake valve for controlling the flow of pressure to and from said brake pipe, and a handle operating said engineer's automatic brake valve; an automatic train control valve, said elements being operatively connected and so organized that when said train control valve is operated the pressure in said engineer's automatic brake valve is exhausted independent of the movement of the handle thereof.

2. In combination with an air brake system having means for supplying compressed air, a main reservoir for storing compressed air, a brake pipe and an engineer's automatic brake valve for controlling the flow of pressure in and out of said brake pipe; an automatic train control valve, said elements being operatively connected and so organized that pressure in said engineer's automatic brake valve is exhausted through said train control valve by the operation of said train control valve.

3. In combination with an air brake system having means for supplying compressed air, a main reservoir for storing compressed air, a brake pipe and an engineer's automatic brake valve controlling the flow of pressure in and out of said brake pipe, said engineer's automatic brake valve being so organized that a reduction of pressure in said engineer's automatic brake valve will cause the brakes to apply; an automatic train control valve, including an exhaust valve operatively connected with said engineer's automatic brake valve, said elements being operatively connected and so organized that when said train control valve is operated, the pressure in said engineer's automatic brake valve is exhausted through said exhaust valve in said train control valve.

4. In combination with an air brake system having means for supplying compressed air, a main reservoir for storing compressed air, a brake pipe and an engineer's automatic brake valve controlling the flow of pressure in and out of said brake pipe, said engineer's automatic brake valve being so organized that a reduction of pressure in said engineer's automatic brake valve will cause the brakes to apply; an automatic train control valve, including a supply valve adapted to be operatively connected to said main reservoir and said engineer's automatic brake valve and adapted in its open position to permit the flow of pressure to said engineer's automatic brake valve, said elements being operatively connected and so organized that when said train control valve is operated said supply valve is closed and the flow of pressure to said engineer's automatic brake valve thereby cut off.

5. In combination with an air brake system having means for supplying compressed air, a main reservoir for storing compressed air, a brake cylinder, and means for charging and exhausting the pressure in said brake cylinder to apply and release the brakes; an automatic train control valve, said elements being operatively connected and so organized that the exhaust of pressure from said brake cylinder is prevented by the operation of said train control valve.

6. In combination with an air brake system having means for supplying compressed air, a main reservoir for storing compressed air, a brake cylinder, and means for charging and exhausting said brake cylinder to apply and release the brakes; an automatic train control valve, a valve mechanism operatively associated with said train control valve and said means for charging and exhausting said brake cylinder, said elements being operatively connected and so organized that when said train control valve is operated, said valve mechanism is closed and the exhaust of pressure from said brake cylinder is thereby prevented.

7. In combination with an air brake system having means for supplying compressed air, a main reservoir for storing compressed air, a brake cylinder, and means for charging and exhausting said brake cylinder to apply and release the brakes; an automatic train control valve including supply valve means operatively connected with said main reservoir and said brake cylinder, said elements being operatively connected and so organized that when said train control valve is operated, said supply valve means is actuated to admit pressure to said brake cylinder to apply the brakes.

8. In combination with an air brake system having means for supplying compressed air, a main reservoir for storing compressed air, a brake pipe, an engineer's automatic brake valve controlling the flow of pressure to and from said brake pipe, said engineer's automatic brake valve being so organized that a reduction of pressure in said engineer's automatic brake valve will cause the train brakes to apply, a brake cylinder, and means for charging and exhausting said brake cylinder to apply and release the locomotive brakes; an automatic train control valve, said elements being operatively connected and so organized that when said train control valve is operated, pressure is permitted to flow into said brake cylinder on said locomotive, and the pressure in said brake pipe is subsequently reduced to apply said train brakes.

9. In combination with an air brake system having means for supplying compressed air, a main reservoir for storing compressed air, a brake pipe, an engineer's automatic brake valve controlling the flow of pressure to and from said brake pipe, said engineer's automatic brake valve being so organized that a reduction of pressure in said engineer's automatic brake valve will cause the train brakes to apply, a brake cylinder, and means for charging and exhausting said brake cylinder to apply and release the locomotive brakes; an automatic train control valve, said elements being operatively connected and so organized that when said train control valve is operated, pressure is permitted to flow into said brake cylinder on said locomotive, and the pressure in said brake pipe is subsequently reduced to apply said train brakes, and upon blocking a passage in said train control valve, the brakes on said locomotive and train are caused to apply in unison.

10. In an air brake system having means for supplying compressed air, a main reservoir for storing compressed air, a brake pipe, an engineer's automatic brake valve controlling the flow of pressure to and from said brake pipe, a brake cylinder, and means for controlling the flow of pressure to and from said brake cylinder; an automatic train control valve having a series of control chambers, and exhaust and supply valve mechanisms arranged in said train control valve and actuated by the pressure in said control chambers, said elements being operatively connected and so organized that upon varying the pressure in said control chambers said exhaust and supply valve mechanisms are actuated to control the pressures in said brake pipe and brake cylinder.

11. In an air brake system having means for supplying compressed air, a main reservoir for storing compressed air, a brake pipe, an engineer's automatic brake valve controlling the flow of pressure to and from said brake pipe, a brake cylinder, and means for controlling the flow of pressure to and from said brake cylinder; an automatic train control valve having a series of control chambers, a reducing valve operatively connected with said main reservoir and said control chambers, an electro-pneumatic valve controlling the flow of pressure from said reducing valve to said control chambers, and exhaust and supply valve mechanisms arranged in said train control valve and actuated by the pressure in said control chambers, said elements being operatively connected and so organized that upon admitting reduced main reservoir pressure to said control chambers, said exhaust and supply valve mechanisms are actuated to apply the locomotive and train brakes.

12. In an air brake system having means for supplying compressed air, a main reservoir for storing compressed air, a brake pipe, an engineer's automatic brake valve controlling the flow of pressure to and from said brake pipe, a brake cylinder, and means for controlling the flow of pressure to and from said brake cylinder; an automatic train control valve having a series of control chambers, a reducing valve operatively connected with said main reservoir and said control chambers, an electro-pneumatic valve controlling the flow of pressure from said reducing valve to said control chambers, exhaust and supply valve mechanisms arranged in said train control valve and actuated by the pressure in said control chambers, said elements being operatively connected and so organized that upon admitting reduced main reservoir pressure to said control chambers, said exhaust and supply valve mechanisms are actuated to apply the locomotive and train brakes, and a reset valve adapted to exhaust said chambers and return said exhaust and supply valve mechanisms to their normal positions and permit the release of the brakes.

13. In combination with an air brake system having means for supplying compressed air, a main reservoir for storing compressed air, a brake pipe and an engineer's automatic brake valve controlling the flow of pressure to and from said brake pipe; an automatic train control valve operatively connected with said elements and having a main reservoir pressure chamber, a piston chamber communicating therewith, a control chamber, an engineer's automatic brake valve pressure chamber, a port connecting said reservoir pressure chamber and said engineer's automatic brake valve pressure chamber, a passage connecting said main reservoir pressure chamber and said control chamber, pressure reducing means arranged in said passage, an electro-pneumatic valve controlling the flow of pressure through said passage, a piston arranged in said piston chamber, a valve controlling the flow of pressure through said port and actuated by said piston, a by-pass normally equalizing the pressures on opposite sides of said piston, spring means normally tending to hold said piston in the position in which said valve actuated thereby is open, a piston valve actuated by pressure in said control chamber to close said by-pass, and means responsive to the closing of said by-pass for permitting said piston to move to a position in which the valve controlled thereby closes the port between the main reservoir chamber and the engineer's automatic brake valve chamber and thereby cuts off communication between the main reservoir and the engineer's automatic brake valve.

14. In combination with an air brake system having means for supplying compressed air, a main reservoir for storing compressed air, a brake cylinder, an automatic distributing valve, an independent brake valve and an automatic exhaust pipe; an automatic train control valve operatively connected with said elements and having a control chamber, an electro-pneumatic valve adapted to admit reduced main reservoir pressure to said control chamber, a shut-off valve interposed in said automatic exhaust pipe, said shut-off valve being actuated by the pressure in said control chamber to prevent the exhaust of brake cylinder pressure through said automatic exhaust pipe.

15. In combination with an air brake system having means for supplying compressed air, a main reservoir for storing compressed air, a brake cylinder and an automatic distributing valve; an automatic train control valve operatively connected with said elements and having a control chamber, a brake cylinder pressure chamber and a passage connecting said chambers, a pipe connecting said passage with said automatic distributing valve and said independent brake valve, an electro-pneumatic valve adapted to admit reduced main reservoir pressure to said control chamber, a check valve preventing the flow of pressure from said passage to said control chamber, a sliding check valve arranged in said brake cylinder pressure chamber and movable to a position over a port leading to said passage, said sliding check valve being adapted to prevent the flow of pressure from said brake cylinder pressure chamber to said passage, piston means for moving said sliding check valve to a position over said port when pressure is admitted to said control chamber and spring means for returning the parts to normal position upon the exhaust of pressure from said control chamber.

16. In combination with an air brake system having means for supplying compressed air, a main reservoir for storing compressed air, a brake pipe, an engineer's automatic brake valve, and an equalizing reservoir connected with said brake valve, said brake valve being so organized that when the pressure in said equalizing reservoir is reduced, pressure is exhausted from said brake pipe and the brakes applied; an automatic train control valve having a control chamber and an exhaust valve chamber and an exhaust outlet, a pipe connecting said equalizing reservoir with said exhaust valve chamber, an exhaust valve normally preventing the flow of pressure from said exhaust valve chamber to said exhaust outlet, a piston in said control chamber and operated by pressure in said control chamber to open said exhaust valve and exhaust said equalizing reservoir, and an electro-pneumatic valve adapted to admit reduced main reservoir pressure to said control chamber.

17. In combination with an air brake system having means for supplying compressed air, a main reservoir for storing compressed air, a brake pipe, an engineer's automatic brake valve controlling the flow of pressure to and from said brake pipe, a brake cylinder, an automatic distributing valve and an independent brake valve; a train control valve operatively connected with said elements and adapted to control the operation of the brakes, an electro-pneumatic valve controlling the operation of said train control valve, said electro-pneumatic valve having a valve stem, an electro-magnet adapted when energized to hold said valve stem in a position in which said valve is closed, spring means tending to hold said valve open and means for forestalling the opening of said valve, comprising a forestalling member adapted to engage said stem and prevent its opening movement and air pressure actuated means for moving said forestalling member to its operative position.

18. In combination with an air brake system having means for supplying compressed air, a main reservoir for storing compressed air, a brake pipe, an engineer's automatic brake valve controlling the flow of pressure to and from said brake pipe, a brake cylinder, an automatic distributing valve and an independent brake valve; a train control valve operatively connected with said elements and adapted to control the operation of the brakes, an electro-pneumatic valve controlling the operation of said train control valve, said electro-pneumatic valve having a valve stem, an electro-magnet adapted when energized to hold said valve stem in a position in which said valve is closed, spring means tending to hold said valve open and means for forestalling the opening of said valve, comprising a forestalling piston arranged in a piston chamber, and said piston having a restricted passage therethrough, a piston stem movable by said piston to engage said electro-pneumatic valve stem and prevent its opening movement, a forestalling valve adapted to admit pressure to said piston chamber and move said piston and piston stem to their operative positions, spring means for returning said piston to its inoperative position, an equalizing reservoir connected with said piston chamber at the opposite end from which pressure is introduced thereto, and means for venting the pressure from the end of said piston chamber at which pressure is introduced thereto.

19. In an air brake system, a reducing valve comprising a casing having a chamber, a pressure supply passage and a reduced pressure outlet port, said passage and port communicating with said chamber at one end thereof, a piston arranged in said chamber, a valve mounted on said piston and adapted in one extreme position of said piston to close said reduced pressure outlet port, a spring arranged at the opposite end of said chamber and tending to hold said piston and valve in its closed position, and a by-pass connecting said reduced pressure outlet passage with the end of said chamber in which said spring is arranged.

20. In an air brake system, a reducing valve comprising a casing having a chamber, a pressure supply passage and a reduced pressure outlet port, said passage and port communicating with said chamber at one end thereof, a piston arranged in said chamber, a valve mounted on said piston and adapted in one extreme position of said piston to close said reduced pressure outlet port, a spring arranged at the opposite end of said chamber and tending to hold said piston and valve in its closed position, a by-pass connecting said reduced pressure outlet passage with the end of said chamber in which said spring is arranged, and means for regulating the tension of said spring comprising a regulating screw plug provided in said casing, one end of said spring bearing against said screw plug, the other end of said spring bearing against said piston.

21. In combination with an air brake system having means for supplying compressed air, a main reservoir for storing compressed air, a brake pipe, an engineer's automatic brake valve for controlling the flow of pressure in and out of said brake pipe, and a locomotive brake cylinder; an automatic train control valve, said elements being operatively connected and so organized that during the operation of said train control valve the pressure in said locomotive cylinder is maintained through pressure controlled by said train control valve.

22. In combination with an air brake system having means for supplying compressed air, a main reservoir for storing compressed air, a brake pipe, an engineer's automatic brake valve for controlling the flow of pressure in and out of said brake pipe, and a locomotive brake cylinder; an automatic train control valve, said elements being operatively connected and so organized that communication between said main reservoir and said engineer's automatic brake valve is cut off by the operation of said train control valve, and said train control valve being so organized that the air pressure in said locomotive brake cylinder is maintained during the operation of said train control valve.

In testimony whereof I affix my signature.

FRANK H. DUKESMITH.